P. MÜNZER.
PURIFYING WATER CONTAINING MINERAL SALTS.
APPLICATION FILED JAN. 28, 1910.

1,199,098. Patented Sept. 26, 1916.

Witnesses:
L. E. Barkley
E. M. Moore

Inventor
Paul Münzer,
per
Frank S. Ankenman
Attorney.

UNITED STATES PATENT OFFICE.

PAUL MÜNZER, OF BRAUNSFELD, NEAR COLOGNE, GERMANY, ASSIGNOR TO REISERT AUTOMATIC WATER PURIFYING COMPANY, A CORPORATION OF NEW JERSEY.

PURIFYING WATER CONTAINING MINERAL SALTS.

1,199,098.  Specification of Letters Patent.  Patented Sept. 26, 1916.

Application filed January 28, 1910. Serial No. 540,554.

*To all whom it may concern:*

Be it known that I, PAUL MÜNZER, a subject of the Emperor of Germany, residing at Braunsfeld, near Cologne, Germany, have invented new and useful Improvements in Purifying Water Containing Mineral Salts, of which the following is a specification.

This invention relates to an apparatus for the purification of water by means of carbonate of barium. In the purification of water by the aid of lime and carbonate of barium, the necessary quick lime required for the removal of the bi-carbonate of calcium and of the magnesia is added to the water to be purified in the form of a saturated aqueous solution of lime in exactly measured quantity, while the carbonate of barium requisite for the removal of the sulfate of lime must be added in large excess and be continuously penetrated by the entire quantity of water to be purified. In consequence of the admixture of the saturated solution of lime, the space available for the purification with barium in which the carbonate of barium is placed (the so called barium bath), is considerably occupied by the deposit formed from the bi-carbonates. The carbonate of barium is gradually rendered impure by the deposit of this mud, which is of no value for the purification process, so that finally in order to obtain the necessary space for the carbonate of barium, a large proportion of the mud, which nevertheless contains a large part of the still available carbonate of barium, must be thrown away. In order to prevent this loss of the useful carbonate of barium and to utilize the same to the uttermost, the present invention is devised. This invention consequently is designed to effect the removal of the bi-carbonates from the water to be purified in special receptacles, before the water can enter the barium bath, and the first mentioned space must be cleaned out more frequently and in it moreover may be deposited the residues from the barium bath before these latter are entirely thrown away in order to exhaust the last remainders of the carbonate of barium.

Figure 1:
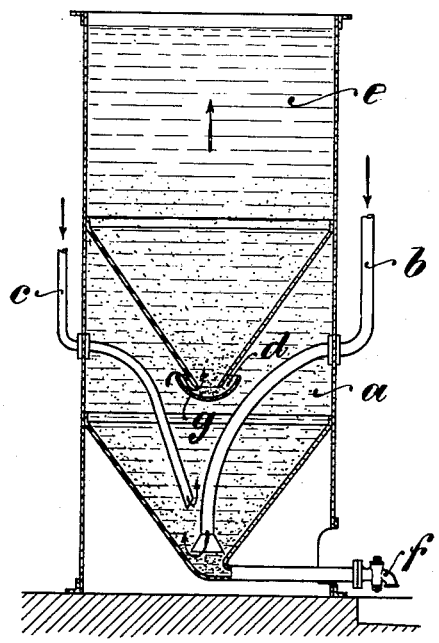
Figure 2:
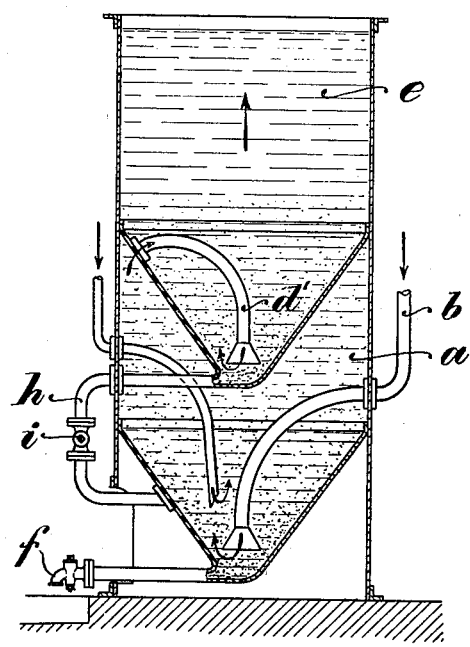
Figure 3:
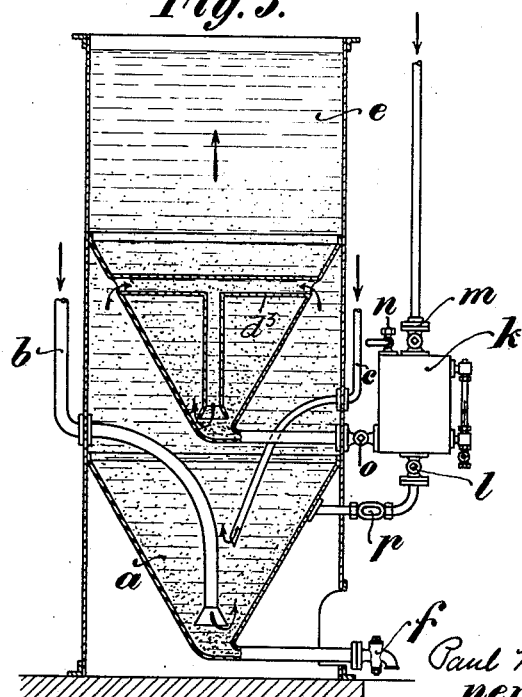

Apparatus for the carrying out of this invention is illustrated in section in various modifications in Figs. 1, 2 and 3 of the drawings.

The crude water flows into the chamber $a$ through the tube $b$ and the saturated solution of lime through the tube $c$; this solution requisite for the removal of the bi-carbonates having been prepared apart in a saturator of any convenient or known construction. The mixture rises and passes after the chemical reaction is complete and the precipitate formed has been for the most part separated by settling, through the aperture $d$ (Fig. 1) or the tube $d'$ or $d^2$ (Figs. 2 and 3) into the barium bath $e$. The precipitate produced in the chamber $a$ collects underneath in the cone of this chamber and is discharged therefrom through the cock $f$. In the chamber $e$ carbonate of barium in excess in the floating condition is penetrated by the water, and the sulfate of lime is converted into the insoluble sulfate of barium. From time to time a portion of the precipitate which still contains carbonate of barium, is run off out of the chamber $e$ in to the chamber $a$. The water passing into this chamber, which still contains its entire amount of sulfuric acid, exhausts the remaining portion of the carbonate of barium. It cannot, however, be entirely freed from the sulfuric acid by this means, but by consuming the carbonate of barium it renders the removal of the precipitate possible without waste of barium and the constant maintenance of a quantity of precipitate in the baryta vessel $e$ with the necessary excess of carbonate of barium requisite for the complete removal of the sulfuric acid.

In the apparatus shown in Fig. 1, the removal of a portion of the precipitate from the chamber $e$ through the opening $d$ in the chamber $a$, is effected automatically by opening the cock $f$; the quantity of precipitate to be drawn off can moreover be determined by constructing the cap $g$ movable and adjustable, or as in Fig. 2 by placing a valve $i$ in the precipitate connecting tube $h$, which valve can be opened or closed according to need. The cap $g$ in Fig. 1 is so arranged that barium precipitate from the chamber $e$ cannot by itself fall down during the rising of the water or on the standing still of the apparatus into the space $a$. To obtain this latter result it is requisite to make use of an impetus, caused by removing part of the contents of chamber $a$, which can be effected for instance in the already described manner, by opening the cock $f$. In Fig. 2 the transfer of precipitate from the chamber $e$ into the chamber $a$ can only take place by opening the valve $i$. It is obviously also feasible to draw off the precipitate from the chamber $e$ firstly to the outside into a special container (not shown in the drawings). In case a special pipe, as shown in Fig. 2, is used for discharging the precipitate from the baryta vessel $e$ into the lime purifying vessel $a$, then in this latter, as shown in Fig. 3, a measuring vessel $k$ can be interposed. This vessel may be open above or closed. In Fig. 3 the latter construction is shown.

The action of the apparatus is as follows: The cocks $l$ and $m$ are closed and the air cock $n$ and the cock $o$ are open so that the precipitate from the baryta vessel $e$ can pass into the measuring vessel $k$. When this vessel is filled, the cocks $n$ and $o$ are closed again and cocks $l$ and $m$ opened. Through the cock $m$ water under pressure passes in and forces the precipitate out of the vessel $k$ into the vessel $a$. Through the window $p$ the passage of the precipitate through the vessel $k$ can be observed. When the precipitate is removed from the vessel $k$, the cock $m$ is closed.

In the case of waters which contain no bicarbonate and consequently are to be treated exclusively with carbonate of barium, there occurs a collection of worthless precipitate in the barium chamber, so that after a certain period a portion of the precipitate which still contains barium carbonate must be discharged. For such waters also the described principle of dividing the operation into stages can be applied in order to attain a better utilization of the carbonate of barium. The water to be purified first flows into the chamber $a$, in which, in such a case, no lime need be introduced, but in which the partially exhausted barium carbonate proceeding from previous cleansing of the chamber $e$ is placed; this carbonate is thereby almost entirely used up. By this means a partial removal of the sulfuric acid compounds contained in the water is effected, while the complete purification takes place in the chamber $e$ by means of the fresh barium carbonate contained therein.

What I claim is:

1. A water purifying apparatus comprising separate chambers, one containing a reagent to precipitate carbonates from the water and the other containing a barium bath, and means permitting the transfer of unspent barium to the carbonate precipitating chamber, together with means for supplying water to be purified to the apparatus and means for delivering the purified water therefrom.

2. Improved water purifying apparatus comprising a primary reaction and precipitating chamber, a second reaction and precipitating chamber, means for periodically discharging the partially exhausted contents from the bottom of the second chamber into the first chamber, and means for supplying and circulating water to be purified through the said chambers from the first into the second and for discharging the purified water.

3. Improved water purifying apparatus comprising a primary reaction and precipitating chamber, a second reaction and precipitating chamber, a tube connecting the two chambers through which the water to be purified can pass from the first chamber to the second chamber, a second tube connecting the chambers, and a measuring vessel in said second tube adapted to measure the precipitate transferred from the second into the first chamber.

4. Water purifying apparatus, comprising reaction and precipitating chambers in series, adapted to contain reagent, means for supplying water to be purified, means for discharging the purified water, and controllable means for transferring precipitate with unspent reagent at intervals from the bottom of one chamber to a preceding chamber of said series.

5. Water purifying apparatus, comprising two reaction and precipitating chambers adapted to contain reagent, means for supplying the water to be purified and causing the same to flow through said chambers in series, means for discharging the purified water, and means for periodically transferring deposit containing unspent reagent from one chamber to the chamber prior in series.

6. Water purifying apparatus comprising separate reaction and precipitating chambers, one being a barium bath chamber and the other being for the treatment of the water by lime, means for causing the water to be purified to traverse the chambers in series, first through the lime chamber and then through the barium bath chamber, and means for removing deposit from the barium bath chamber and admitting it to the water in advance of the barium bath.

7. A water purifying apparatus comprising separate chambers, one containing a lime bath and the other a barium bath, means for supplying the water to be purified to the lime bath chamber, the water thence passing to the barium bath chamber, and means whereby unspent barium is transferred from the barium bath chamber to the lime bath chamber.

8. A water purifying apparatus comprising separate chambers, one above the other, the upper chamber containing a barium bath and the lower chamber having an inlet for water to be purified, the chambers being connected so that the water flows from the lower to the upper chamber, and means for effecting transfer of unspent barium from the upper to the lower chamber.

9. Water purifying apparatus, comprising reaction and precipitating chambers, means for causing the water to be purified to traverse said chambers in series, one of said chambers being adapted to receive barium carbonate, means for supplying lime water to a preceding chamber of the series, and means for controllably transferring deposit containing unspent barium carbonate from the barium chamber to the lime chamber.

10. Water purifying apparatus, comprising two reaction and precipitating chambers, means for causing the water to be purified to circulate through said reaction and precipitating chambers in series including means of communication between said chambers whereby the water to be purified flows from one into the other, and separate means of communication leading downward from the bottom of the second chamber into the preceding chamber and adapted to enable deposit containing unspent reagent to be transferred from said second chamber to the preceding chamber.

11. Water purifying apparatus, comprising reaction and precipitating chambers, means for causing the water to be purified to circulate through said reaction and precipitating chambers in series including a passage leading from the top of one of said chambers to the bottom of a succeeding chamber, and a valved passage leading from the bottom of the latter chamber to the former chamber and adapted to enable the transfer of precipitate with unspent reagent from said latter chamber to said former chamber.

12. Water purifying apparatus, comprising reaction and precipitating chambers, means for supplying and causing the water to be purified to traverse said chambers in series, means for discharging the purified water, controllable means for transferring precipitate with unspent reagent from the bottom of one of said chambers to the preceding chamber of the series, and means for drawing off from the last-named chamber.

13. Water purifying apparatus, comprising reaction and precipitating chambers, means for causing the water to be purified to traverse the chambers in series, and means for transferring measured quantities of precipitate with unspent reagent from one of said chambers to a preceding chamber of the series.

In testimony whereof I have signed my name to this specification in the presence of two subscribing witnesses.

PAUL MÜNZER.

Witnesses:
 LOUIS VANDORY,
 GERTRUD BONA.